US011053837B2

(12) United States Patent
Jonnalagadda Balu

(10) Patent No.: US 11,053,837 B2
(45) Date of Patent: Jul. 6, 2021

(54) COOLING SYSTEM VALVE

(71) Applicant: Volvo Truck Corporation, Gothenburg (SE)

(72) Inventor: Rajasekar Jonnalagadda Balu, Bangalore (IN)

( * ) Notice: Subject to any disclaimer, the term of this patent is extended or adjusted under 35 U.S.C. 154(b) by 123 days.

(21) Appl. No.: 16/467,657

(22) PCT Filed: Nov. 28, 2017

(86) PCT No.: PCT/EP2017/080627
§ 371 (c)(1),
(2) Date: Jun. 7, 2019

(87) PCT Pub. No.: WO2018/104106
PCT Pub. Date: Jun. 14, 2018

(65) Prior Publication Data

US 2020/0072116 A1 Mar. 5, 2020

(30) Foreign Application Priority Data

Dec. 9, 2016 (IN) ............................. 201641042177

(51) Int. Cl.
*F01P 7/14* (2006.01)
*F01P 3/18* (2006.01)
(Continued)

(52) U.S. Cl.
CPC .................. *F01P 7/14* (2013.01); *F01P 3/18* (2013.01); *F01P 11/04* (2013.01); *F16K 5/0647* (2013.01);
(Continued)

(58) Field of Classification Search
CPC ................ A01N 59/00; C02F 2303/04; F02M 25/0222; F02M 25/0228; F02M 25/025;
(Continued)

(56) References Cited

U.S. PATENT DOCUMENTS 1,285,267 A 11/1918 Lund
2,998,223 A 8/1961 Baxter
(Continued)

FOREIGN PATENT DOCUMENTS

CN 102812219 A 12/2012
CN 104520552 A 4/2015
(Continued)

OTHER PUBLICATIONS

First Office Action for Chinese Patent Application No. 201780075953.6, dated Sep. 2, 2020, 10 pages.
(Continued)

*Primary Examiner* — Long T Tran
*Assistant Examiner* — James J Kim
(74) *Attorney, Agent, or Firm* — Withrow & Terranova PLLC

(57) ABSTRACT

The present invention relates to a cooling system valve (24) for an internal combustion engine cooling system (12), the internal combustion engine cooling system (12) comprising a radiator (14) and a coolant passage (16) adapted to cool at least a portion of an internal combustion engine (18), the cooling system valve (24) being adapted to be located between the radiator (14) and the coolant passage (16), as seen in an intended direction of flow from the radiator (14) to the coolant passage (16). The cooling system valve (24) is adapted to automatically assume each one of at least the following conditions: —an open condition, allowing coolant transport from the radiator (14) towards the coolant passage (16) via the cooling system valve (24), and —a closed condition, preventing coolant transport in a direction from the coolant passage (16) towards the radiator (14) via the cooling system valve (24).

16 Claims, 7 Drawing Sheets

(51) Int. Cl.

| | |
|---|---|
| ***F01P 11/04*** | (2006.01) |
| ***F16K 5/06*** | (2006.01) |
| ***F16K 17/34*** | (2006.01) |
| ***F16K 31/163*** | (2006.01) |
| ***F16K 31/36*** | (2006.01) |
| ***F16K 31/363*** | (2006.01) |

(52) U.S. Cl.
CPC .......... *F16K 17/34* (2013.01); *F16K 31/1635* (2013.01); *F16K 31/36* (2013.01); *F16K 31/363* (2013.01); *F01P 2007/146* (2013.01); *F01P 2025/04* (2013.01); *F01P 2037/00* (2013.01); *F01P 2050/22* (2013.01)

(58) Field of Classification Search
CPC .......... F01P 2007/146; F01P 7/16; F01P 7/14; F01P 2025/04; F16K 31/1635
USPC ............................................ 123/25 G, 41.08
See application file for complete search history.

(56) References Cited

U.S. PATENT DOCUMENTS 3,774,678 A 11/1973 Glorisi
4,546,792 A 10/1985 Lew et al.
4,964,371 A * 10/1990 Maeda .................... F01P 7/167 123/41.1
5,404,842 A * 4/1995 Matsushiro ............. F01P 7/167 123/41.1
5,975,031 A * 11/1999 Bartolazzi ............... F01P 7/164 123/41.02
6,109,218 A * 8/2000 Bachschmid ........... F01P 7/165 123/41.08
2002/0139594 A1* 10/2002 Gabioli ................... E02F 3/325 180/68.4
2002/0166604 A1 11/2002 Camacho et al.
2013/0221116 A1* 8/2013 Tsuchiya .............. G05D 23/134 236/34.5
2015/0219002 A1* 8/2015 Hayase ................. F02B 39/005 60/605.3
2018/0283258 A1* 10/2018 Watanabe ................ F01P 11/16

FOREIGN PATENT DOCUMENTS

DE 1576703 A1 4/1970
FR 3036135 A1 11/2016
GB 160994 A 4/1921
GB 1552987 A 9/1979
WO 03021157 A1 3/2003
WO 2015197405 A1 12/2015
WO 2016047304 A1 3/2016

OTHER PUBLICATIONS

International Search Report and Written Opinion for International Patent Application No. PCT/EP2017/080627, dated May 7, 2018, 20 pages.

* cited by examiner

COOLING SYSTEM VALVE

This application is a 35 USC 371 national phase filing of International Application No. PCT/EP2017/080627, filed Nov. 28, 2017, which claims priority to Indian patent application no. 201641042177, filed Dec. 9, 2016, the disclosures of which are incorporated herein by reference in their entireties.

TECHNICAL FIELD

The present invention relates to a cooling system valve. Moreover, the present invention relates to a coolant conduit. Furthermore, the present invention relates to an internal combustion engine cooling system. Moreover, the present invention relates to an internal combustion engine assembly. Further, the present invention relates to a method for assembling an internal combustion engine cooling system. Additionally, the present invention relates to a method for fluidly disconnecting a radiator from a coolant passage and also to a method for performing service on an internal combustion engine cooling system.

The invention can be applied in heavy-duty vehicles, such as trucks, buses and construction equipment. Although the invention will be described with respect to a truck, the invention is not restricted to this particular vehicle, but may also be used in other vehicles such as buses, construction equipment or seagoing vessels such as boats. Moreover, the present invention may be used in internal combustion engine assemblies not necessarily being located in or on a vehicle.

BACKGROUND

An internal combustion engine may be adapted to be cooled by an internal combustion engine cooling system comprising a radiator in fluid communication with a coolant passage adapted to cool at least a portion of the internal combustion engine. During operation of the internal combustion engine, coolant may flow from the radiator to the coolant passage where the coolant cools a portion of the internal combustion engine, as a consequence of which the coolant is heated, and the coolant is thereafter returned to the radiator in order to cool the coolant. The coolant may be a liquid.

In various types of internal combustion engine service operations, coolant needs to be removed from the internal combustion engine cooling system. When such a service operation is required, a service person, such as a mechanic, generally drains off coolant from the internal combustion engine cooling system prior to carrying out the required service tasks. However, draining off coolant may be a time-consuming process which adds to the total service operation time. The total service time generally is correlated to the service cost for the owner of the internal combustion engine.

As such, it would be desirable to shorten total service operation time for at least one service operation for an internal combustion engine.

SUMMARY

An object of the invention is to provide a device which may imply an appropriately low service operation time for at least one service operation for an internal combustion engine.

The object is achieved by a cooling system valve according to claim 1.

As such, the present invention relates to a cooling system valve for an internal combustion engine cooling system. The internal combustion engine cooling system comprises a radiator and a coolant passage adapted to cool at least a portion of an internal combustion engine. The cooling system valve is adapted to be located between the radiator and the coolant passage, as seen in an intended direction of flow from the radiator to the coolant passage.

According to the present invention, the cooling system valve is adapted to automatically assume each one of at least the following conditions:

- an open condition, allowing coolant transport from the radiator towards the coolant passage via the cooling system valve, and
- a closed condition, preventing coolant transport in a direction from the coolant passage towards the radiator via the cooling system valve.

The above cooling system valve, which is adapted to automatically assume each one of at least the above two conditions, implies the possibility to obtain a reduced risk for coolant leakage from the coolant passage to the ambient environment when the coolant passage is fluidly disconnected from the radiator. As such, the above cooling system valve implies that the radiator may be fluidly disconnected from the coolant passage without necessarily obtaining a flow of coolant from the coolant passage.

As such, in service operations of an internal combustion engine cooling system and/or of an internal combustion engine associated with such a system, that do not require the cooling system being substantially emptied before service operations may be initiated, the above cooling system valve implies that at least a portion of the coolant in the coolant passage may be retained during the service operation. Thereafter, when the service operation is completed, the time consumption for replenishing coolant to the cooling system may also be kept appropriately low since coolant has been retained in the cooling system, in particular in the coolant passage thereof, during the service operation.

Examples of service operations not requiring that the complete cooling system be emptied of coolant prior to the operation can be carried out include for instance: replacing or removing at least one of the following components of an internal combustion engine cooling system radiator, fan shroud, fan ring, expansion tank and radiator upper hose.

As such, by virtue of the above cooling system valve, the total service operation time for an internal combustion engine may be kept appropriately low. Moreover, owing to the fact that the coolant may retained in the cooling system even during one or more types of service operations implies an appropriately low waste of coolant.

Optionally, the cooling system valve may be adapted to automatically assume each one of the conditions in dependence of an operational state of the internal combustion engine.

The above ability implies that the cooling system valve may be adapted to automatically assume each one of the conditions for certain predetermined operational state(s) of the internal combustion engine. For instance, the cooling system valve may be adapted to assume the closed condition when the internal combustion engine is not running. Optionally, the operational state may comprise at least one of the following: a coolant temperature, a coolant flow rate, a coolant pressure and an indication whether or not the internal combustion engine is running.

Optionally, the cooling system valve is adapted to automatically assume each one of the conditions in dependence of a pressure applied to at least a portion of the cooling system valve. The above ability implies that the cooling system valve may for instance be adapted to assume the closed condition when the pressure applied to at least a portion of the cooling system valve is below a predetermined pressure threshold, for instance when the pressure corresponds to atmospheric pressure. In such an example, the valve may assume the closed condition when the cooling system valve is disconnected from a portion of the internal combustion engine cooling system such that at least a portion of the cooling system valve is exposed to the air ambient of the cooling system.

Optionally, the cooling system valve is adapted to automatically assume each one of the conditions in dependence of a pressure upstream the cooling system valve, as seen in an intended direction of flow from the radiator to the coolant passage. When the cooling system valve is disconnected from the cooling system, a portion of the cooling system valve facing the radiator, as seen along the fluid communication between the radiator and the coolant passage, is prone to being exposed to the air ambient of the cooling system. In other words, an upstream portion of the cooling system valve may be exposed to the ambient air. As such, the above-mentioned ability to automatically assume each one of the conditions in dependence of a pressure upstream the cooling system valve implies an appropriate control of the cooling system valve, for instance when the cooling system valve is disconnected from a portion of the internal combustion engine cooling system.

Optionally, the cooling system valve is adapted to automatically assume the closed condition when the pressure upstream the cooling system valve is equal to or below a predetermined threshold value. As has been indicated hereinabove, the predetermined threshold value may correspond to atmospheric pressure or be a factor multiplied by the atmospheric pressure. As a non-limiting example, the factor may be within the range of 1-1.5.

Optionally, the cooling system valve comprises a valve member and a valve housing, the valve member being moveable relative to the valve housing to thereby obtain the open and closed conditions, the position of the valve member relative to the valve housing being controlled by the pressure upstream the cooling system valve. The above features imply an appropriate embodiment of the cooling system valve enabling an appropriate control of the valve.

Optionally, the valve member is adapted to pivot relative the valve housing. The ability to pivot the valve member implies that the cooling system valve can be made relatively compact.

Optionally, the cooling system valve comprises a valve member actuator, adapted to move the valve member relative to the valve housing. The cooling system valve further comprises a pilot pressure conduit in fluid communication with the valve member actuator. The pilot pressure conduit may be used for controlling the condition of the valve. For instance, the pilot pressure conduit may be in fluid communication with a fluid control line such that the condition of the cooling system valve is controlled by controlling the pressure in the fluid control line.

Optionally, the pilot pressure conduit fluidly connects the valve member actuator to a portion of the cooling system valve upstream the valve member, as seen in an intended direction of flow from the radiator to the coolant passage.

As such, when the cooling system valve is connected to the cooling system, coolant may enter the pilot pressure conduit and the coolant pressure consequently controls the condition of the cooling system valve. As such, the opening or closing of the valve may be controlled in dependence of the coolant pressure. Alternatively, the cooling system valve may be such that when the cooling system valve is connected to the cooling system such that coolant is present in the pilot pressure conduit, the cooling system valve is in the open condition, and when the cooling system valve is disconnected from at least a portion of the cooling system such that the pilot pressure conduit is in fluid communication with the environment ambient of the cooling system, for instance thereby filling the pilot pressure conduit with air, the cooling system valve assumes the closed condition.

Optionally, the cooling system valve comprises an actuator chamber in fluid communication with the pilot pressure conduit, at least a portion of the valve member actuator delimiting the actuator chamber such that the valve member actuator can move in response to a pressure in the actuator chamber. The actuator chamber implies that the cooling system valve may be relatively compact.

Optionally, the valve member actuator is fixedly connected to the valve member, the valve member actuator being adapted to pivot in response to a pressure in the actuator chamber. The fixed connection between the valve member actuator and the valve member implies a robust assembly for controlling the condition of the cooling system valve with an appropriately low number of moving parts.

Optionally, the valve member actuator is connected to the valve member via a transmission arrangement transferring a rectilinear motion of the valve member actuator into a pivot motion of the valve member, the valve member actuator being adapted to move rectilinearly in response to a pressure in the actuator chamber. The above transmission arrangement implies an appropriate versatility in the position of the actuator chamber relative to the valve member.

Optionally, the valve member actuator is adapted to accommodate fluid fed from the pilot pressure conduit, the valve member actuator being adapted to deform in response to a pressure of the fluid accommodated in the valve member actuator.

Optionally, the valve member actuator is fixedly connected to the valve member.

Optionally, the cooling system valve comprises a biasing means adapted to bias the valve member towards the closed condition.

A second aspect of the present invention relates to a coolant conduit adapted to form part of an internal combustion engine cooling system comprising a radiator and a coolant passage adapted to cool at least a portion of an internal combustion engine. The coolant conduit is adapted to be located between the radiator and the coolant passage, as seen in an intended direction of flow from the radiator to the coolant passage. According to the second aspect of the present invention, the coolant conduit comprises a cooling system valve according to the first aspect of the present invention.

A third aspect of the present invention relates to an internal combustion engine cooling system comprising a radiator and a coolant passage adapted to cool at least a portion of an internal combustion engine. The internal combustion engine cooling system comprises a cooling system valve according to the first aspect of the present invention and/or a coolant conduit according to the second aspect of the present invention. The cooling system valve is located between the radiator and the coolant passage, as seen in an intended direction of flow from the radiator to the coolant passage.

Optionally, the internal combustion engine cooling system further comprises a coolant pump adapted to circulate coolant in the internal combustion engine cooling system.

The coolant pump is located between the radiator and the coolant passage, as seen in an intended direction of flow from the radiator to the coolant passage.

Optionally, the cooling system valve is located between the radiator and the coolant pump, as seen in an intended direction of flow from the radiator to the coolant passage.

A fourth aspect of the present invention relates to an internal combustion engine assembly comprising an internal combustion engine and an internal combustion engine cooling system according to the third aspect of the present invention.

A fifth aspect of the present invention relates to vehicle comprising an internal combustion engine assembly according to the fourth aspect of the present invention.

A sixth aspect of the present invention relates to a method for assembling a combustion engine cooling system. The combustion engine cooling system comprises a radiator and a coolant passage adapted to cool at least a portion of an internal combustion engine. The method comprises connecting the radiator to the coolant passage by means of a coolant conduit according to the second aspect of the present invention.

A seventh aspect of the present invention relates to a method for fluidly disconnecting a radiator from a coolant passage adapted to cool at least a portion of an internal combustion engine cooling system, wherein, during operating conditions of the internal combustion engine cooling system, the radiator is fluidly connected to the coolant passage by means of a coolant conduit according to the second aspect of the present invention. The method comprises disconnecting the coolant conduit from the radiator, whereby the cooling system valve closes automatically.

An eighth aspect of the present invention relates to a method for performing service on an internal combustion engine cooling system comprising a radiator, a coolant passage adapted to cool at least a portion of an internal combustion engine and a coolant conduit. The method comprises fluidly disconnecting the radiator from the coolant passage in accordance with the seventh aspect of the present invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

The invention will be described below for a vehicle in the form of a truck 10 such as the truck illustrated in FIG. 1. The truck 10 should be seen as an example of a vehicle which could comprise a cooling system valve, a coolant conduit and/or an internal combustion engine cooling system according to the present invention. However, the present invention may be implemented in a plurality of different types of vehicles. Purely by way of example, the present invention could be implemented in a truck, a tractor, a car, a bus, a seagoing vessel such as a ship or a boat, a work machine such as a wheel loader or an articulated hauler, or any other type of construction equipment. Moreover, the present invention may be implemented in an internal combustion that need not be associated with any vehicle.

Figure 1:
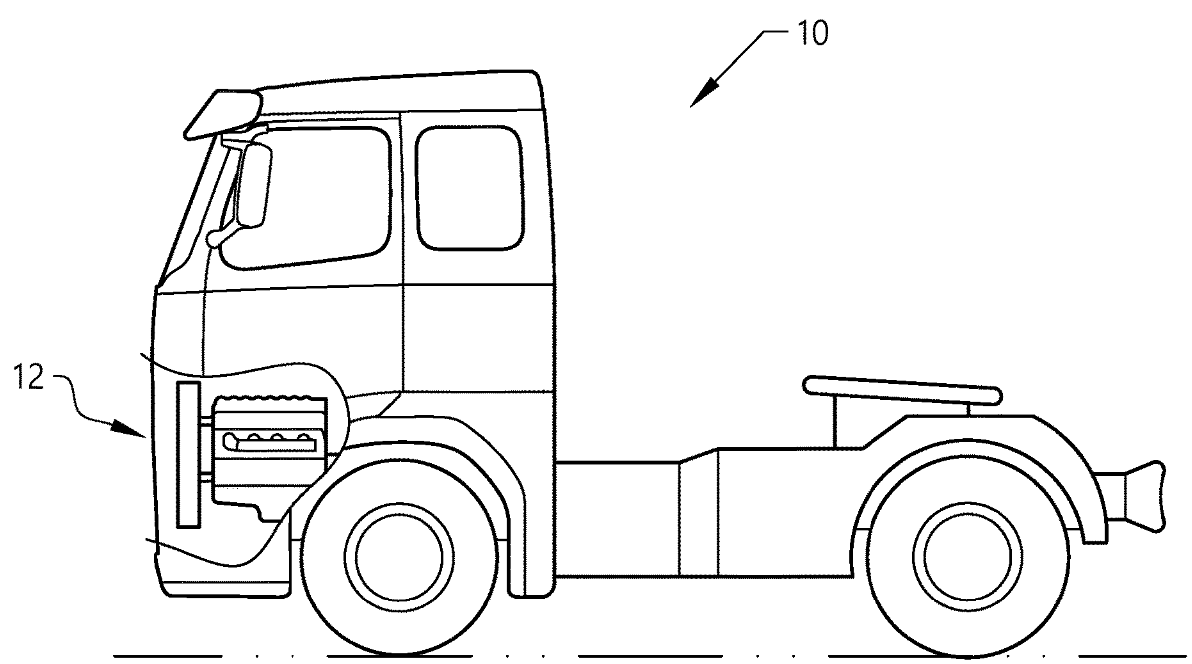
FIG. 1 is a schematic drawing of a vehicle.

The FIG. 1 vehicle 10 comprises an internal combustion engine cooling system 12.

Figure 2:
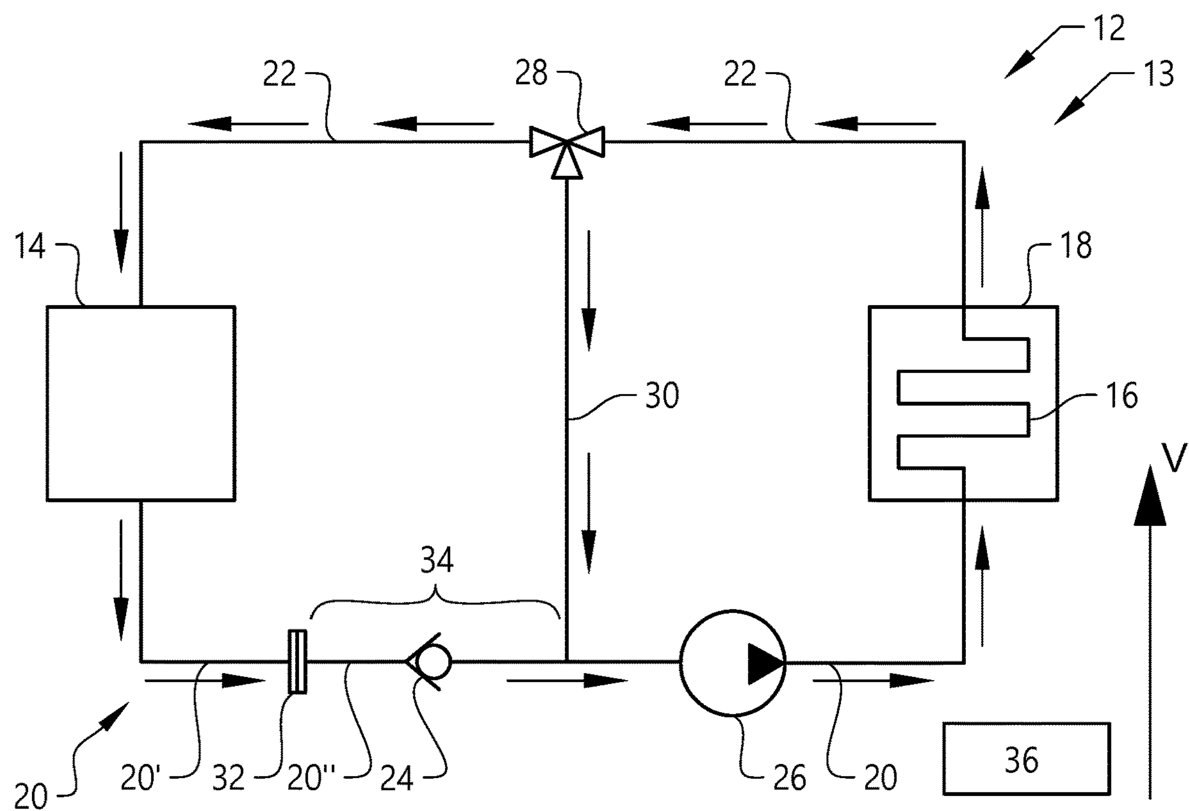
FIG. 2 is a schematic side view of an embodiment of an internal combustion engine cooling system.

FIG. 2 is a schematic side view of an internal combustion engine cooling system 12 comprising a radiator 14 and a coolant passage 16 adapted to cool at least a portion of an internal combustion engine 18. The internal combustion engine cooling system 12 and the internal combustion engine 18 may form an internal combustion engine assembly 13.

Purely by way of example, the coolant passage 16 may comprise one or more conduits in an engine block (not shown) of the internal combustion engine 18 and/or one or more conduits external to the internal combustion engine 18 and arranged to be in thermal communication therewith. Moreover, FIG. 2 illustrates that the internal combustion engine cooling system 12 has an extension in a vertical direction V and that the assembly 12 comprises a coolant feeding conduit assembly 20 for guiding coolant from the radiator 14 to the coolant passage 16, and a fluid returning conduit assembly 22 for guiding coolant from the coolant passage 16 to the radiator 14. Preferably, and as is exemplified in FIG. 2, as seen in the vertical direction, the lowest point of the coolant feeding conduit assembly may be lower than the highest point of the fluid returning conduit assembly 22.

Moreover, FIG. 2 illustrates a cooling system valve 24 adapted to be located between the radiator 14 and the coolant passage 16, as seen in an intended direction of flow from the radiator 14 to the coolant passage 16. As such, the cooling system valve 24 may be located in the coolant feeding conduit assembly 20.

The intended direction of flow, which is illustrated by arrows in FIG. 2, may for instance be achieved by a pump 26. As a non-limiting example, the pump may be located between the radiator 14 to the coolant passage 16, such as in the FIG. 2 coolant feeding conduit assembly 20. Such a position may be preferred since the portion of the internal combustion engine cooling system 12 connecting the radiator 14 to the coolant passage 16 generally is the lowermost portion of the assembly 12. Thus, the above-mentioned position of the pump 26 implies that the pump 26 will be fed by coolant when the pump 26 is operating. Moreover, as indicated in FIG. 2, the cooling system valve 24 may be located between the radiator 14 and the coolant pump 26.

The FIG. 2 embodiment also comprises a thermostat valve 28 located between the coolant passage 16 and the radiator 14, as seen in an intended direction of flow from the coolant passage 16 to the radiator 14. For instance, and as is exemplified in FIG. 2, the thermostat valve 28 may be located in the FIG. 2 fluid returning conduit assembly 22.

The purpose of the thermostat valve 28 is to bypass the radiator 14 under certain conditions, for instance if the coolant temperature is lower than a predetermined threshold temperature. To this end, the thermostat valve 28 may be in fluid communication with a bypass conduit 30 and the thermostat valve 28 may be arranged to selectively provide a fluid communication between a portion of the fluid returning conduit assembly 22 and the bypass conduit 30. As may be gleaned from FIG. 2, the cooling system valve 24 is distinct from the thermostat valve 28.

However, in other embodiments of the internal combustion engine cooling system 12, the thermostat valve 28 may be omitted.

The internal combustion engine cooling system 12 may also comprise a coupling 32 connecting a first feeding conduit assembly portion 20' to a second feeding conduit assembly portion 20". The coupling 32 is located between the radiator 14 and the cooling system valve 24, as seen in an intended direction of flow from the radiator 14 to the coolant passage 16. The coupling 32 may assume a disconnected condition, in which the first feeding conduit assembly portion 20' is fluidly disconnected from the second feeding conduit assembly portion 20", and a connected condition, in which the a first feeding conduit assembly portion 20' is fluidly connected to the second feeding conduit assembly portion 20".

As is exemplified in FIG. 2, the second feeding conduit assembly portion 20" and the cooling system valve 24 may form part of a coolant conduit 34.

The cooling system valve 24 is adapted to automatically assume each one of at least the following conditions:

- an open condition, allowing coolant transport from the radiator 14 towards the coolant passage 16 via the cooling system valve 24, and
- a closed condition, preventing coolant transport in a direction from the coolant passage 16 towards the radiator 14 via the cooling system valve 24.

The ability to assume any one of the above conditions is beneficial in a least the following situations. During normal operation of the internal combustion engine 18, e.g. when the internal combustion engine 18 is running, the cooling system valve 24 may assume an open condition, thus allowing coolant to flow from the radiator 14 to the coolant passage 16 to thereby enable the internal combustion engine 18 to be appropriately cooled. However, certain service operations may require that the coupling 32 assumes a disconnected condition, thereby disconnecting the first feeding conduit assembly portion 20' from the second feeding conduit assembly portion 20".

Examples of service operations requiring that the coupling 32 assumes a disconnected condition include for instance replacing or removing at least one of the following components of an internal combustion engine cooling system: the radiator 14, a fan shroud (not shown), a fan ring (not shown), an expansion tank (not shown) and the fluid returning conduit assembly 22.

In situations in which the coupling 32 assumes a disconnected condition, there is a risk that coolant in the coolant passage 16 flows in a direction from the coolant passage 16 to the coupling 32 and thus exits the internal combustion engine cooling system 12. However, when the cooling system valve 24 assumes its closed condition, coolant is prevented from exiting the cooling system 12 along the above-mentioned route. Consequently, the cooling system valve 24 implies that the coolant present in the coolant passage 16 may remain therein even when the coupling 32 assumes a disconnected condition.

As has been intimated hereinabove, the cooling system valve 24 automatically assumes each one of at least the closed condition and the open condition. As such, an operator, such as a mechanic, need not actuate the cooling system valve 24 separately, e.g. prior to actuating the coupling 32, so as to assume its disconnected condition.

Purely for illustrative purposes, the cooling system valve 24 is illustrated as a non-return valve in the FIG. 2 embodiment. However, as will be elaborated on hereinabove, a plurality of various embodiments of the cooling system valve 24 is envisioned.

Purely by way of example, the cooling system valve 24 may be adapted to automatically assume each one of the conditions, i.e. open or closed, in dependence of an operational state of the internal combustion engine 18. As a non-limiting example, the cooling system valve 24 may be adapted to receive one or more signals from the internal combustion engine 18 or a control unit 36, such as an electronic control unit, controlling the operation of the internal combustion engine 18. Purely by way of example, such control signals may be electric, hydraulic, pneumatic or mechanical control signals or any combination thereof.

Moreover, the cooling system valve 24 may be adapted to assume a condition in response to the signal or signals received. As non-limiting examples, the operational state may comprise at least one of the following: a coolant temperature, a coolant flow rate, a coolant pressure and an indication whether or not the internal combustion engine is running.

Figure 3:
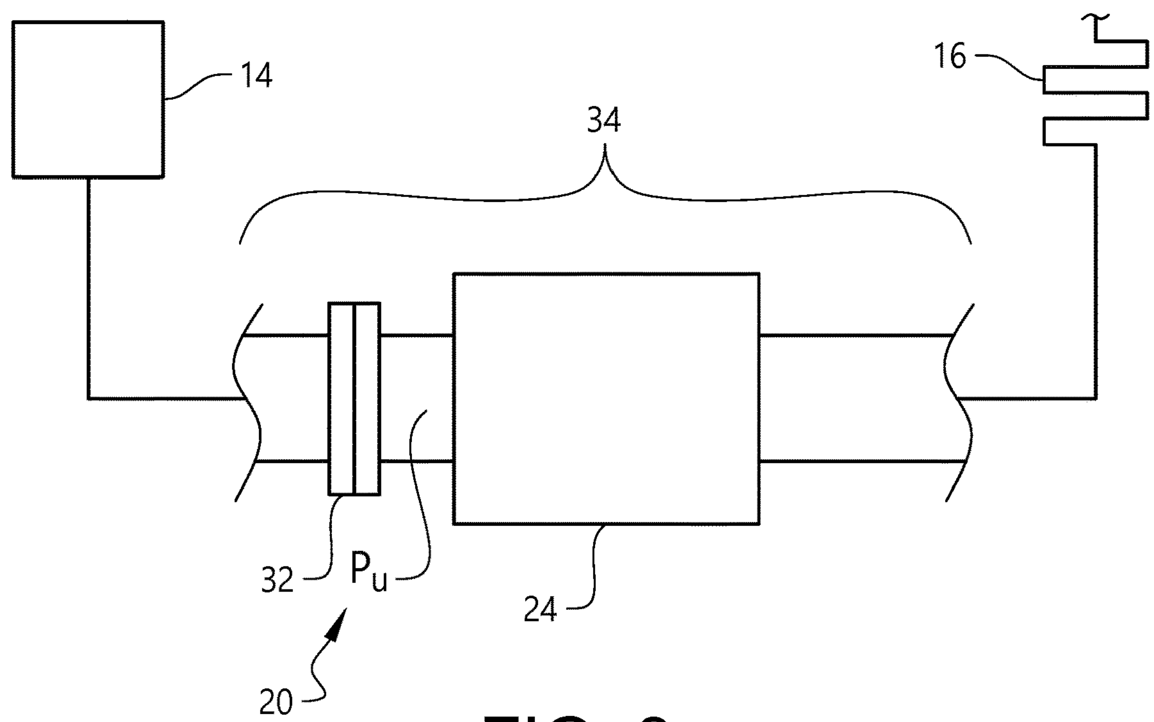
FIG. 3 is a schematic side of an embodiment of a cooling system valve.

Moreover, the cooling system valve 24 may be adapted to automatically assume each one of the conditions in dependence of a pressure applied to at least a portion of the cooling system valve 24. For instance, and with reference to the cooling system valve 24 embodiment illustrated in FIG. 3, the cooling system valve 24 may be adapted to automatically assume each one of the conditions in dependence of a pressure $P_u$ upstream the cooling system valve 24, as seen in an intended direction of flow from the radiator 14 to the coolant passage 16.

As such, and again with reference to FIG. 3, when the coupling 32 assumes its connected condition, the feeding conduit assembly 20 generally is filled with coolant, resulting in that the pressure $P_u$ upstream the cooling system valve 24 corresponds to the liquid column of the coolant located directly upstream the cooling system valve 24. However, when the coupling 32 assumes its disconnected condition, the portion of the feeding conduit assembly 20 located between the coupling 32 and the cooling system valve 24, i.e. the second feeding conduit assembly portion 20", is exposed to the environment ambient of the coolant feeding conduit assembly 20. Generally, when the coupling 32 assumes its disconnected condition, the portion of the feeding conduit assembly 20 located between the coupling 32 and the cooling system valve 24 is filled with air. As such, when the coupling 32 assumes its disconnected condition, the pressure $P_u$ upstream the cooling system valve 24 generally is lower than when the coupling 32 assumes its connected condition and such a pressure difference may be used for controlling the condition of the cooling system valve 24. For instance, the cooling system valve 24 may be adapted to automatically assume the closed condition when the pressure $P_u$ upstream the cooling system valve 24 is equal to or below a predetermined threshold value.

A first example of an embodiment of a cooling system valve 24 which is controllable as above is a non-return valve. Moreover, FIG. 4*a* to FIG. 6*b* illustrate alternative embodiments of the cooling system valve 24, the conditions of which are controllable by the pressure $P_u$ upstream the cooling system valve 24.

Figure 4A:
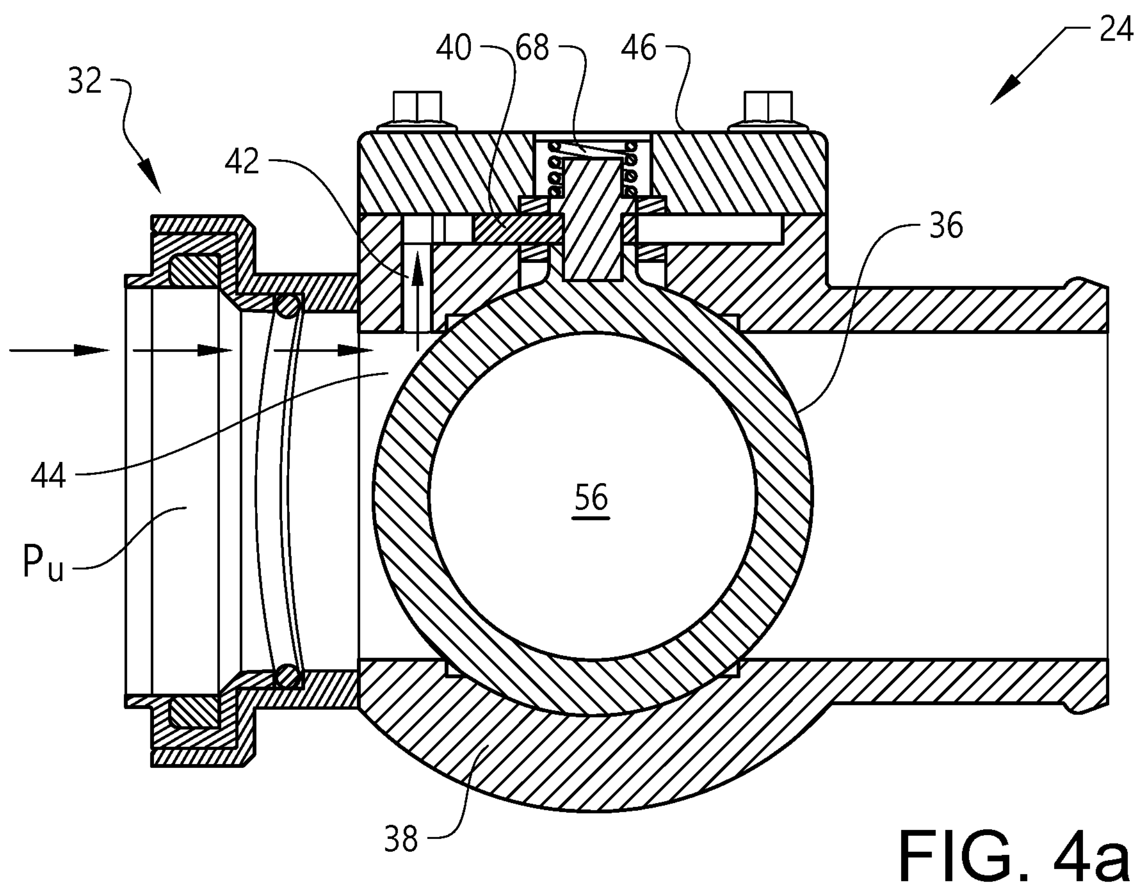
FIGS. 4*a* and 4*b* illustrate a side view and a top view, respectively, of an embodiment of a cooling system valve.
Figure 4B:
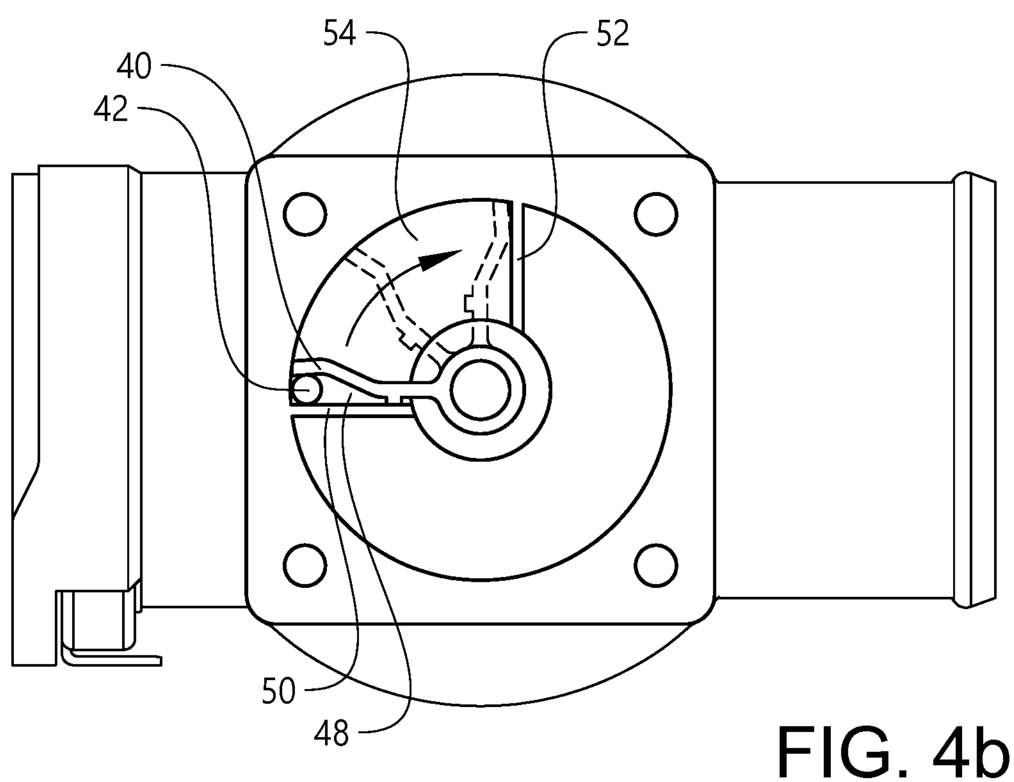

The FIG. 4*a* to FIG. 6*b* embodiments have a plurality of features in common and the common features will be presented with reference to the FIG. 4*a* and FIG. 4*b* embodiment. The FIG. 4*a* and FIG. 4*b* embodiment comprises a valve member 36 and a valve housing 38 wherein the valve member 36 is moveable relative to the valve housing 38 to thereby obtain the open and closed conditions. The position of the valve member 36 relative to the valve housing 38 is controlled by the pressure $P_u$ upstream the cooling system valve 24.

In the FIG. 4*a* and FIG. 4*b* embodiment, the valve member 36 is adapted to pivot relative the valve housing 38.

With reference to FIG. 4*a*, the cooling system valve 24 comprises a valve member actuator 40, adapted to move the valve member 36 relative to the valve housing 38. In the FIG. 4*a* embodiment, the valve member actuator 40 is fixedly connected to the valve member 36 and the valve member actuator 40 is adapted to pivot in response to a pressure on the actuator chamber 48. For instance, and as is indicated in FIG. 4*a*, the valve member 36 may comprise a fluid passage 56, such as an opening, extending through the valve member 36.

The fluid passage 56 may be located and oriented such that fluid may flow through the fluid passage 56 when the cooling system valve 24 assumes the open condition whereas fluid cannot flow through the fluid passage 56 when the cooling system valve 24 assumes the closed condition. Purely by way of example, and as is indicated in FIG. 4*a*, the valve member 36 may be substantially spherically shaped and the fluid passage 56 may extend therethrough such that when the cooling system valve 24 assumes the open condition, the fluid passage 56 is oriented with its main extension substantially parallel to the intended direction of flow through the cooling system valve 24 and when the cooling system valve 24 assumes the closed condition, the fluid passage 56 is oriented with its main extension substantially perpendicular to the intended direction of flow through the cooling system valve 24. FIG. 4*a* illustrates the cooling system valve 24 in the closed position.

The FIG. 4*a* cooling system valve 24 further comprises a pilot pressure conduit 42 in fluid communication with the valve member actuator 40. In FIG. 4*a*, the pilot pressure conduit 42 is adapted to be in fluid communication with a portion 44 of the cooling system valve upstream the valve member 36, as seen in an intended direction of flow from the radiator to the coolant passage (not shown in FIG. 4*a*). However, it is also envisioned that the pilot pressure conduit may be in fluid communication with another fluid source, such as a pilot pressure fluid source (not shown), external of the coolant feeding conduit assembly 20, which pilot pressure fluid source feeds fluid at a pilot pressure to the valve member actuator 40. FIG. 4*a* illustrates that the cooling system valve 24 illustrated therein comprises a lid 46 such that the valve member actuator 40 is located between the valve member 36 and the lid 46.

FIG. 4*b* is a top view of the FIG. 4*a* but in FIG. 4*b*, the lid 46 has been removed. As may be gleaned from FIG. 4*b*, the cooling system valve 24 comprises the actuator chamber 48 in fluid communication with the pilot pressure conduit 42. As is exemplified in FIG. 4*b*, the actuator chamber 48 may be a cavity in the valve housing 38. For instance, the actuator chamber 48 may be drilled, milled or cut into the valve housing material, such that the actuator chamber 48 is confined by end surfaces 50, 52 of the valve housing 38.

Furthermore, as may be gleaned from FIG. 4*b*, at least a portion of the valve member actuator 40 delimits the actuator chamber 48 such that the valve member actuator 40 can move in response to a pressure in the actuator chamber 48. As such, when the pressure in the actuator chamber 48 is above a predetermined pressure threshold, the FIG. 4*b* valve member actuator 40 will rotate in a clockwise direction, as indicated by arrow 54 in FIG. 4*b*, as a consequence of which the valve member 36 will also rotate. As such, if a pressure above a predetermined pressure threshold is applied to the FIG. 4*b* actuator chamber 48, the valve member actuator 40 and the valve member 36 will move in concert such that the cooling system valve 24 assumes the open condition.

Figure 5A:
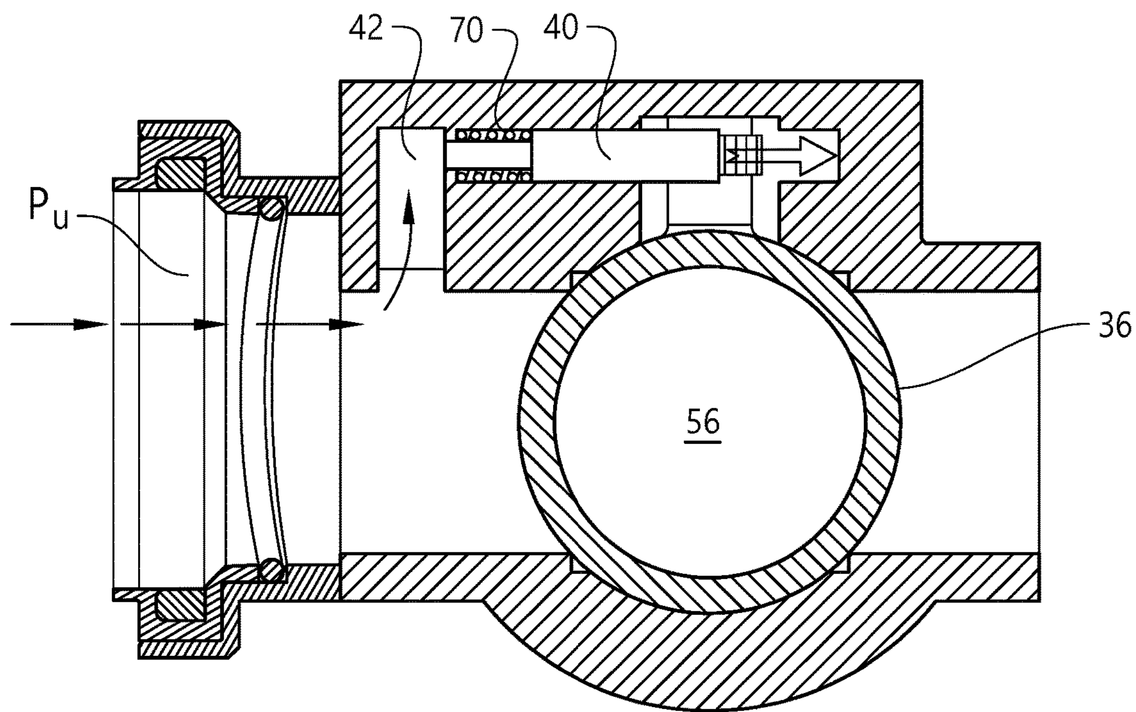
FIGS. 5*a* and 5*b* illustrate a side view and a top view, respectively, of another embodiment of a cooling system valve.
Figure 5B:
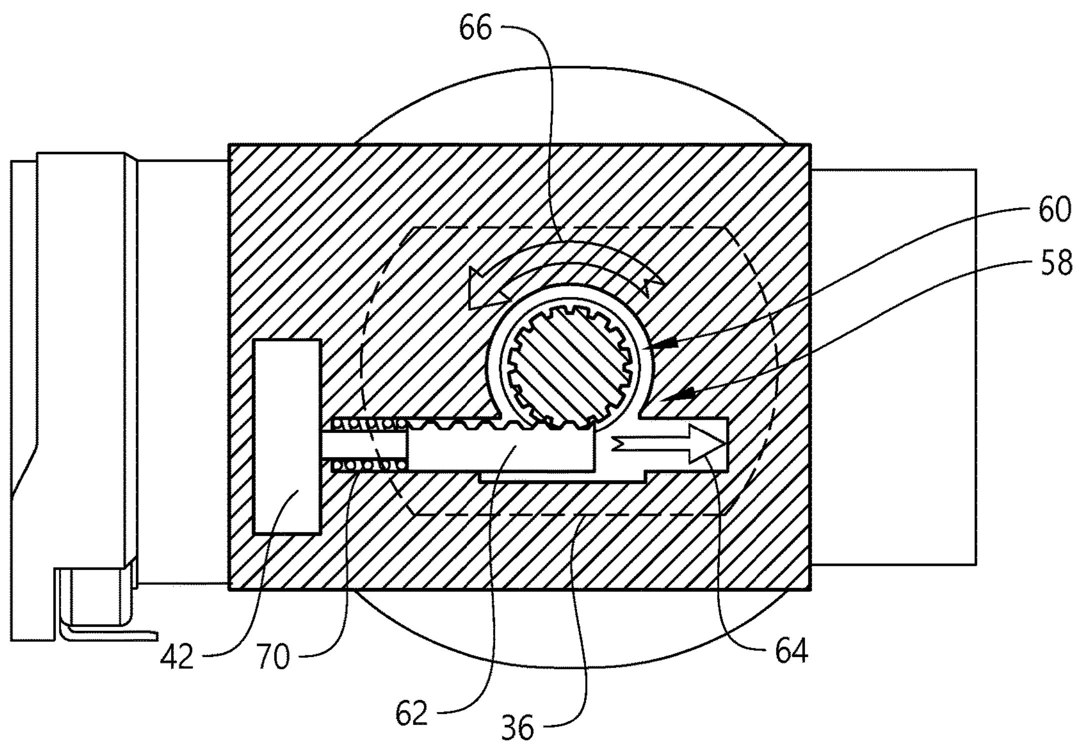

Another embodiment of the cooling system valve 24 is illustrated in FIGS. 5*a* and 5*b*. In FIG. 5*a* and FIG. 5*b*, features that are similar to the features of the FIG. 4*a* and FIG. 4*b* embodiment are assigned the same reference numerals, but the features or their intended functions are repeated in the below presentation of the FIG. 5*a* and FIG. 5*b* embodiment.

As may be gleaned from FIG. 5*a* and FIG. 5*b*, the valve member actuator 40 illustrated therein is connected to the valve member 36 via a transmission arrangement 58 transferring a rectilinear motion of the valve member actuator 40 into a pivot motion of the valve member 36. In the FIGS. 5*a* and 5*b* embodiment, the transmission arrangement 58 is exemplified as a pinion 60, for instance fixedly connected to the valve member 36, and a rack 62, for instance fixedly connected to or forming part of the valve member actuator 40. By virtue of the transmission arrangement 58 presented hereinabove, a linear displacement of the valve member actuator 40, which linear displacement is illustrated by arrow 64, is converted into a rotation of the valve member 36, which rotation is illustrated by arrow 66.

The cooling system valve 24 may comprise a biasing means adapted to bias the valve member 36 towards the closed condition. Purely by way of example, the biasing means may be such that when the pressure in the pilot pressure conduit 42 is below a predetermined pressure threshold level, the biasing means can move the valve member 36 such that the cooling system valve 24 assumes its closed condition.

In the FIG. 4*a* and FIG. 4*b* embodiment, the biasing means is implemented as a torsion spring 68. Purely by way of example, and as is illustrated in FIG. 4*a*, the FIG. 4*a* biasing means may connect the valve housing 38 to the valve member 36. Moreover, in the FIG. 5*a* and FIG. 5*b* embodiment, the biasing means is implemented as a tension spring 70, such as a coil spring, connecting the valve housing 38 to the rack 62. However, it is also envisioned that the FIG. 5*a* and FIG. 5*b* embodiment may comprise a compression spring (not shown) between the rack 62 and the valve housing 38, such a compression spring may for instance be located to the right of the rack 62 in FIG. 5*b*.

Figure 6A:
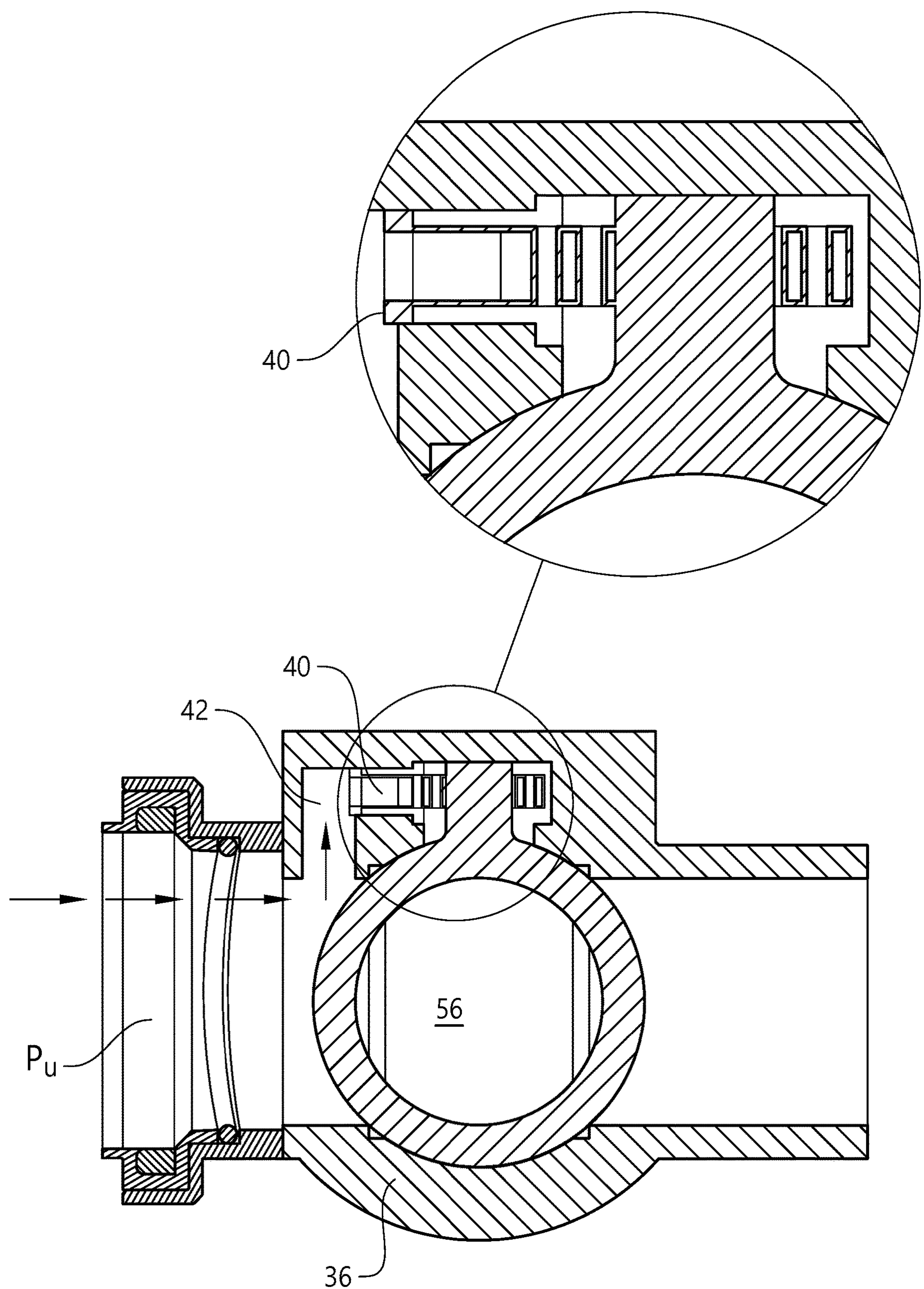
FIGS. 6*a* and 6*b* illustrate a side view and a top view, respectively, of a further embodiment of a cooling system valve.
Figure 6B:
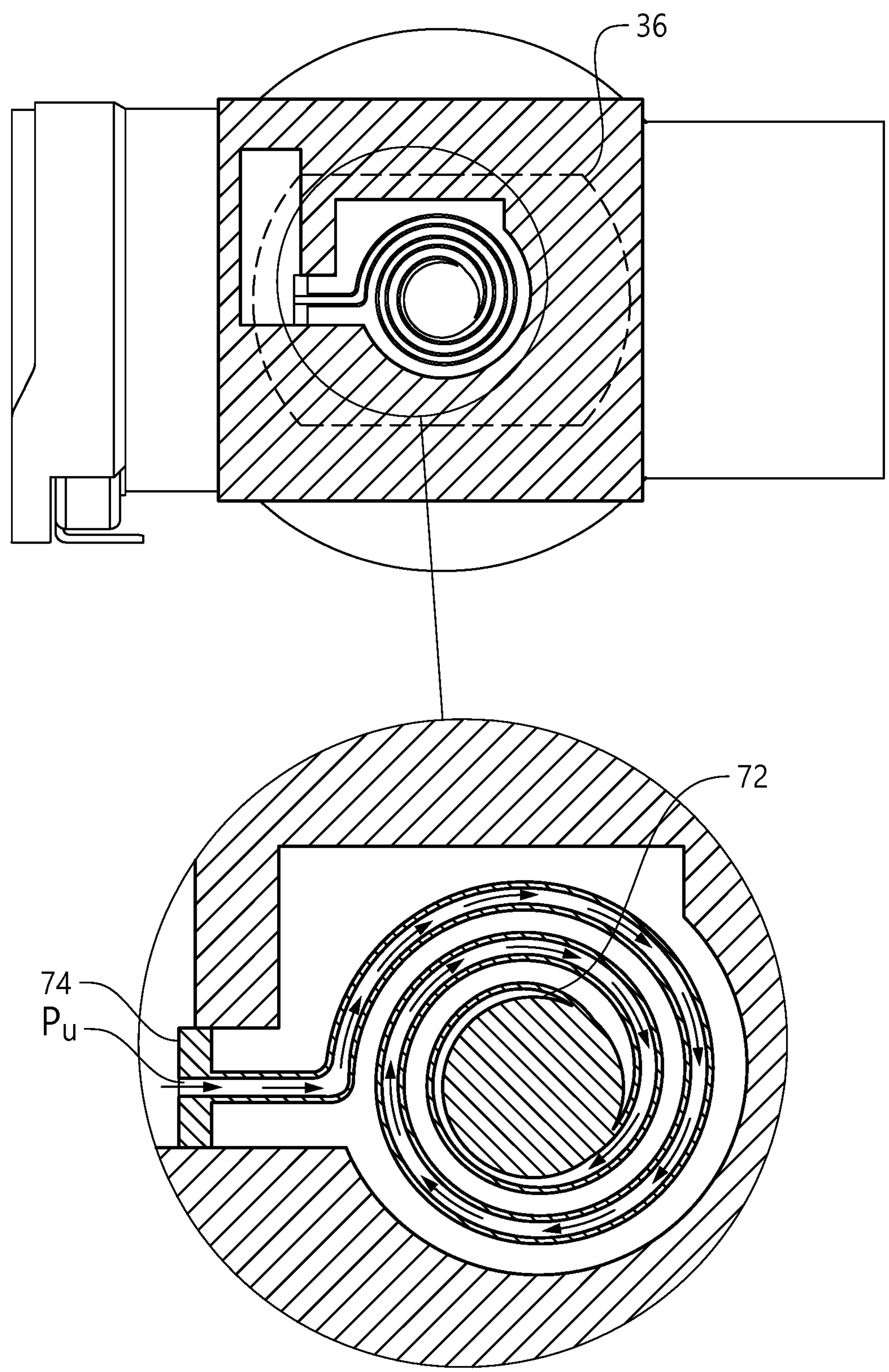

Another embodiment of the cooling system valve 24 is illustrated in FIGS. 6*a* and 6*b*. In FIG. 6*a* and FIG. 6*b*, features that are similar to the features of the FIG. 4*a* and FIG. 4*b* embodiment are assigned the same reference numerals, but the features or their intended functions are repeated in the below presentation of the FIG. 6*a* and FIG. 6*b* embodiment.

In the FIG. 6*a* and FIG. 6*b* embodiment, the valve member actuator 40 is adapted to accommodate fluid fed from the pilot pressure conduit 42. Moreover, the valve member actuator 40 is adapted to deform in response to a pressure of the fluid accommodated in the valve member actuator 40. The FIG. 6*a* and FIG. 6*b* valve member actuator

40 may for instance comprise a flexible conduit with a radial inner portion 72 fixedly connected to the valve member 36 and a radial outer portion 74 fixedly connected to the valve housing 38. Moreover, as may be gleaned from FIG. 6*b*, the valve member actuator 40 may have a coiled shape around the rotational centre of the valve member 36 such that when the pressure in the valve member actuator 40 is above a predetermined threshold pressure, the valve member actuator 40 unwinds and thereby rotates the valve member 36.

The above-discussed coolant conduit 34, comprising a cooling system valve 24, may be used in a method for assembling a combustion engine cooling system 12, such as the FIG. 2 cooling system 12. As such, with reference to FIG. 2, the method comprises connecting the radiator 14 to the coolant passage 16 by means of the coolant conduit 34. The above method may be used for constructing a new cooling system 12.

Figure 7:
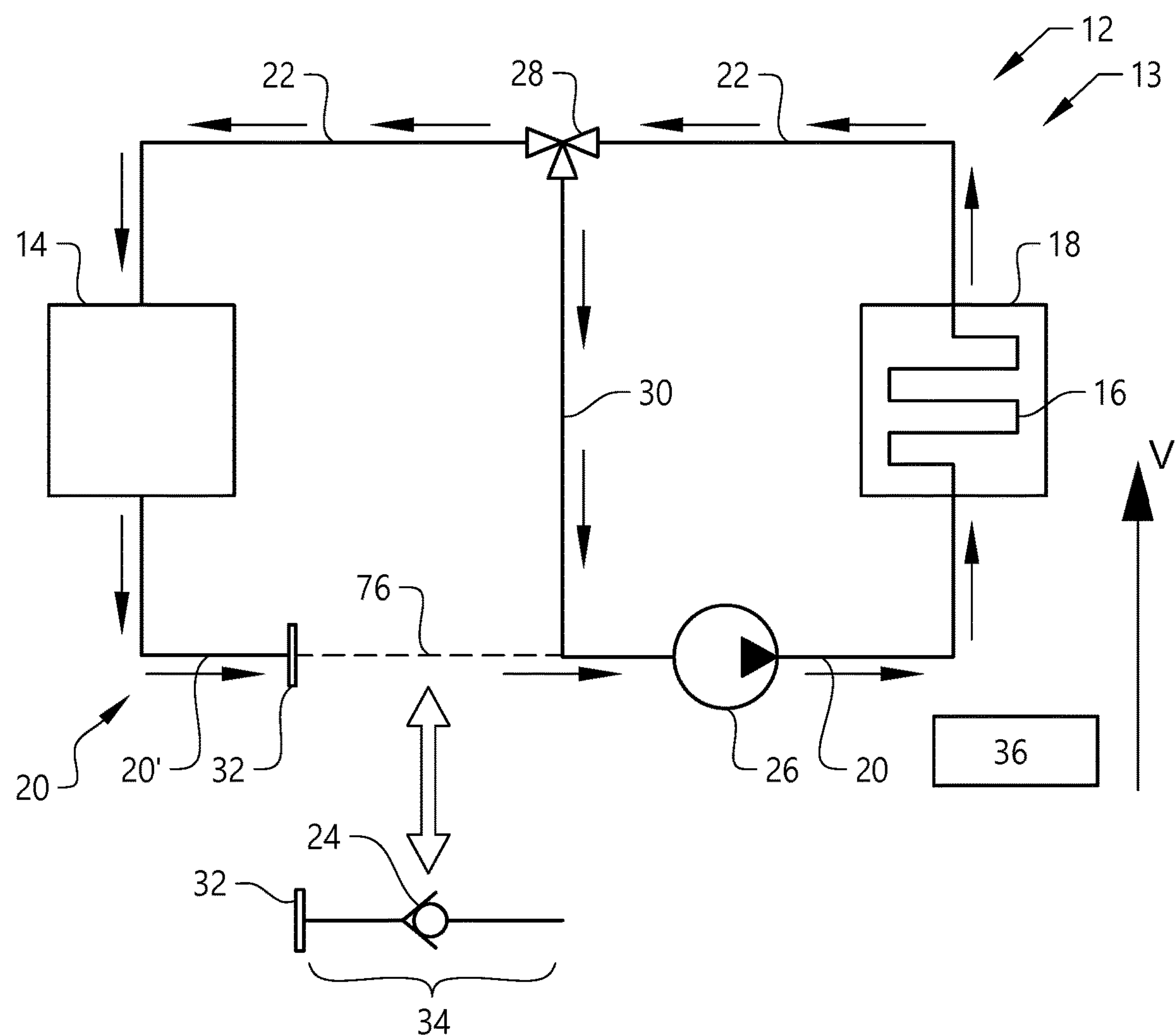
FIG. 7 illustrates a method for modifying an internal combustion engine cooling system.

Moreover, the above method may also form a part of a procedure for modifying a cooling system 12. To this end, reference is made to FIG. 7 illustrating an existing cooling system 12, having a coolant transport conduit 76, forming a part of the first feeding conduit assembly portion 20' and being located between the radiator 14 and the pump 26. Such an existing cooling system 12 may be modified by replacing the coolant transport conduit 76 by a coolant conduit 34 according to the present invention. As may be gleaned from FIG. 7, in order to facilitate the addition of the coolant conduit 34 to the cooling system 12, the coolant conduit 34 may comprise a coupling 32, or at least a portion of such a coupling, in order to enable that the coolant conduit 34 forms part of the first feeding conduit assembly portion 20' in a time-efficient manner. It is envisioned that embodiments of the coolant conduit 34 may be constituted by the cooling system valve 24 and the coupling 32.

An internal combustion engine cooling system 12 according to the present invention, such as the FIG. 2 cooling system 12, may be used in a method for fluidly disconnecting a radiator 14 from a coolant passage 16 adapted to cool at least a portion of an internal combustion engine 18. During operating conditions of the internal combustion engine cooling system 12, the radiator 14 is fluidly connected to the coolant passage 16 by means of a coolant conduit 34, as discussed hereinabove. The method comprises disconnecting the coolant conduit 34 from the radiator 14 whereby the cooling system valve 24 of the coolant conduit 34 closes automatically.

The above method may preferably be used in a method for performing service on an internal combustion engine cooling system 12 in accordance with the present invention. The method comprises fluidly disconnecting the radiator from the coolant passage in accordance with the seventh aspect of the present invention.

It is to be understood that the present invention is not limited to the embodiments described above and illustrated in the drawings; rather, the skilled person will recognize that many changes and modifications may be made within the scope of the appended claims.

The invention claimed is:

1. A cooling system valve for an internal combustion engine cooling system, said internal combustion engine cooling system comprising a radiator and a coolant passage adapted to cool at least a portion of an internal combustion engine, said cooling system valve being adapted to be located between said radiator and said coolant passage, as seen in an intended direction of flow from said radiator to said coolant passage, said cooling system valve being adapted to automatically assume each one of at least the following conditions:

an open condition, allowing coolant transport from said radiator towards said coolant passage via said cooling system valve, and a closed condition, preventing coolant transport in a direction from said coolant passage towards said radiator via said cooling system valve, wherein said cooling system valve is adapted to automatically assume each one of said conditions in dependence of a pressure upstream said cooling system valve, as seen in an intended direction of flow from said radiator to said coolant passage, wherein said cooling system valve comprises a valve member and a valve housing, said valve member being moveable relative to said valve housing to thereby obtain said open and closed conditions, the position of said valve member relative to said valve housing being controlled by said pressure upstream said cooling system valve, wherein said valve member is adapted to pivot relative said valve housing, wherein said cooling system valve comprises a valve member actuator, adapted to move said valve member relative to said valve housing, said cooling system valve further comprising a pilot pressure conduit in fluid communication with said valve member actuator.

2. The cooling system valve according to claim 1, wherein said cooling system valve is adapted to automatically assume said closed condition when said pressure upstream said cooling system valve is equal to or below a predetermined threshold value.

3. The cooling system valve according to claim 1, wherein said pilot pressure conduit fluidly connects said valve member actuator to a portion of said cooling system valve upstream said valve member, as seen in an intended direction of flow from said radiator to said coolant passage.

4. The cooling system valve according to claim 1, wherein said cooling system valve comprises an actuator chamber in fluid communication with said pilot pressure conduit, at least a portion of said valve member actuator delimiting said actuator chamber such that said valve member actuator can move in response to a pressure in said actuator chamber.

5. The cooling system valve according to claim 1, wherein said valve member actuator is fixedly connected to said valve member, said valve member actuator being adapted to pivot in response to a pressure in said actuator chamber.

6. The cooling system valve according to claim 1, wherein said valve member actuator is connected to said valve member via a transmission arrangement transferring a rectilinear motion of said valve member actuator into a pivot motion of said valve member, said valve member actuator being adapted to move rectilinearly in response to a pressure in said actuator chamber.

7. The cooling system valve claim 1, wherein said valve member actuator is adapted to accommodate fluid fed from said pilot pressure conduit, said valve member actuator being adapted to deform in response to a pressure of the fluid accommodated in said valve member actuator.

8. The cooling system valve according to claim 7, wherein said valve member actuator is fixedly connected to said valve member.

9. The cooling system valve according to claim 1, wherein said cooling system valve comprises a biasing means adapted to bias said valve member towards said closed condition.

10. The cooling system valve according to claim 1, wherein a coolant conduit is adapted to form part of an internal combustion engine cooling system comprising a radiator and a coolant passage adapted to cool at least a portion of an internal combustion engine, said coolant conduit being adapted to be located between said radiator and said coolant passage, as seen in an intended direction of flow from said radiator to said coolant passage, said coolant conduit comprising the cooling system valve.

11. The cooling system valve of claim 1, wherein an internal combustion engine cooling system comprising a radiator and a coolant passage is adapted to cool at least a portion of an internal combustion engine, said internal combustion engine cooling system comprising the cooling system valve, said cooling system valve being located between said radiator and said coolant passage, as seen in an intended direction of flow from said radiator to said coolant passage.

12. The cooling system valve according to claim 11, wherein said internal combustion engine cooling system further comprises a coolant pump adapted to circulate coolant in the internal combustion engine cooling system, said coolant pump being located between said radiator and said coolant passage, as seen in an intended direction of flow from said radiator to said coolant passage.

13. The cooling system valve according to claim 12, wherein said cooling system valve is located between said radiator and said coolant pump, as seen in an intended direction of flow from said radiator to said coolant passage.

14. The cooling system valve according to claim 11 wherein an internal combustion engine assembly comprises an internal combustion engine and an internal combustion engine cooling system.

15. The cooling system valve according to claim 14 wherein the internal combustion engine assembly is located in a vehicle.

16. The cooling system valve of claim 10, wherein an internal combustion engine cooling system comprising a radiator and a coolant passage is adapted to cool at least a portion of an internal combustion engine, said internal combustion engine cooling system comprising the coolant conduit, said cooling system valve being located between said radiator and said coolant passage, as seen in an intended direction of flow from said radiator to said coolant passage.

* * * * *